United States Patent

[11] 3,621,025

[72] Inventors Timothy Yu-Wen Jen;
Bernard Loev, both of Broomall, Pa.
[21] Appl. No. 886,370
[22] Filed Dec. 18, 1969
[45] Patented Nov. 16, 1971
[73] Assignee Smith Kline & French Laboratories
Philadelphia, Pa.

[54] IMIDAZO AND PYRIMIDO[2,1-b]QUINAZOLINE COMPOUNDS
7 Claims, No Drawings

[52] U.S. Cl. .................................................. 260/256.4 F,
260/244 A, 260/25 B, 260/251 R, 260/256.4 Q,
260/256.5 R, 260/309.6, 260/562 N, 424/200,
424/232, 424/251, 424/253
[51] Int. Cl. ......................................................... C07d 57/12

[50] Field of Search .......................................... 260/256.4 F

[56] References Cited
UNITED STATES PATENTS
3,257,401 6/1966 Wagner ...................... 260/256.4 F Primary Examiner—Alex Mazel
Assistant Examiner—R. J. Gallagher
Attorneys—William H. Edgerton, Richard D. Foggio, Joan S. Keps, Alan D. Lourie and Joseph A. Marlino ABSTRACT: The compounds are tetrahydroimidazo (and pyrimido)-[2,1-b]quinazolines which have hypotensive activity and in addition have central nervous system depressant activity.

IMIDAZO AND PYRIMIDO[2,1-b]QUINAZOLINE COMPOUNDS

This invention relates to new imidazo and pyrimido-[2,1-b] quinazoline compounds having pharmacodynamic activity, in particular, having hypotensive activity. The hypotensive activity is demonstrated, for example, by administration to metacorticoid hypertensive rats at doses of about 5 to about 80 mg./kg. orally.

In addition, the compounds of this invention have central nervous system depressant activity, in particular they produce a decrease in motor activity.

The imidazo[2,1-b]quinazoline and pyrimido[2,1-b]-quinazoline compounds of this invention are represented by the following formulas:

Formula I 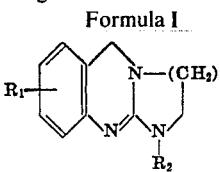  Formula II 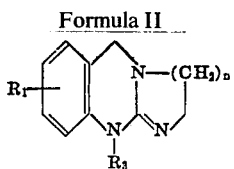

in which:
$R_1$ is hydrogen, halogen, trifluoromethyl, lower alkyl, lower alkoxy, lower alkanoyl, sulfamoyl or hydroxy;
$R_2$ is hydrogen, lower alkyl or lower alkanoyl;
$R_3$ is lower alkyl or lower alkanoyl and $n$ is 1 or 2.

This invention also includes pharmaceutically acceptable acid addition salts of the imidazo and pyrimido-quinazolines of formulas I and II.

Preferred compounds of this invention are represented by formulas I and II in which $R_1$ is hydrogen, chloro, trifluoromethyl or methyl and, in formula I, $R_2$ is hydrogen, methyl or acetyl and, in formula II, $R_3$ is methyl or acetyl.

An advantageous compound of this invention is the compound of formula I in which $R_1$ and $R_2$ are hydrogen and $n$ is 1. This compound, and other compounds of formula I in which $R_2$ is hydrogen, may exist in tautomeric forms which are represented by formula I or by formula II above in which $R_3$ is hydrogen.

The terms "lower alkyl" and "lower alkoxy" where used herein denote groups having 1–4 carbon atoms, the term "lower alkanoyl" denotes groups having 2–4 carbon atoms and the term "halogen" denotes chloro, bromo or fluoro.

The compounds of this invention are prepared as follows:

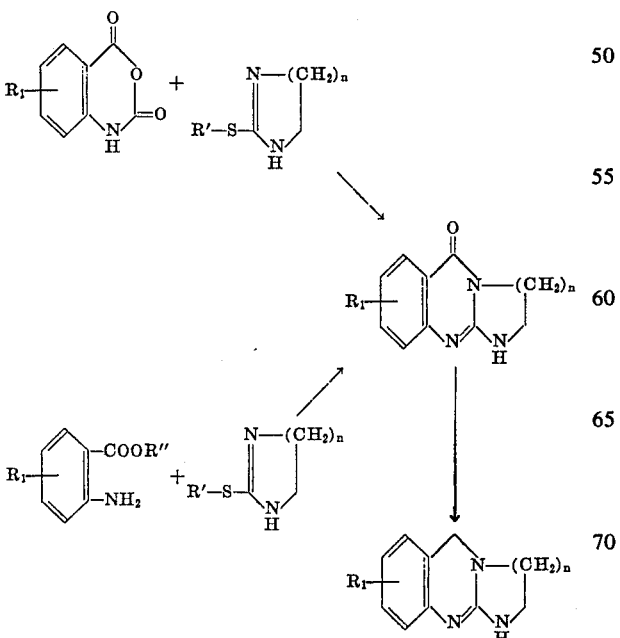

II. 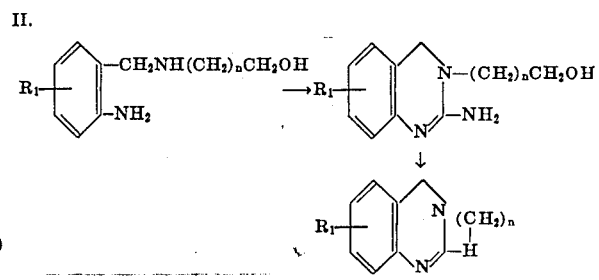

III. 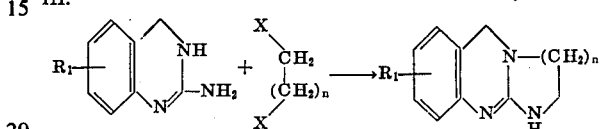

The terms $R_1$ and $n$ are as previously defined, $R'$ is lower alkyl, $R''$ is methyl or ethyl and X is halogen.

According to procedure I above, an isatoic anhydride or a methyl or ethyl anthranilic acid ester is reacted with a 2-lower alkylmercapto-2-imidazoline or -tetrahydropyrimidine to give the imidazo or pyrimido[2,1-b]quinazolinone intermediate, respectively. Reducing this intermediate with, for example, a metallic hydride such as lithium aluminum hydride or a reducing system such as phosphorus pentasulfide and Raney nickel gives the N-unsubstituted imidazo[2,1-b]quinazolines and pyrimido[2,1-b]quinazolines of this invention.

The 2-lower alkylmercapto-2-imidazoline and tetrahydropyrimidine starting materials of procedure I are prepared by reacting a imidazolidine-2-thione or a hexahydropyrimidine-2-thione with a lower alkyl halide.

Alternatively, the imidazo or pyrimidoquinazolinone intermediates of procedure I are prepared by reacting a quinazoline with ethylene glycol or 1,3-propanediol, treating the resulting 2-chloro-4-hydroxyalkoxyquinazoline with thionyl chloride, and reacting the resulting 2-chloro-3-chloroalkyl-3,4-dihydroquinazolin-4-one with ammonia.

By procedure II, a 2-(hydroxyalkylaminomethyl)-aniline is reacted with a standard reagent to form a guanidine, such as cyanamide or cyanogen bromide, and the resulting 2-amino-3,4-dihydro-3-hydroxyalkylquinazoline is treated with acid to give the N-unsubstituted imidazo and pyrimido[2,1-b]-quinazolines of this invention.

According to procedure III, a 2-amino-3,4-dihydroquinazoline is reacted with a 1,2-dihaloethane or 1,3-dihalopropane to give the N-unsubstituted imidazo and pyrimido[2,1-b]-quinazolines of this invention.

The compounds of formula I in which $R_2$ is lower alkyl and of formula II in which $R_3$ is lower alkyl are prepared by procedures I, II and III by using an appropriate N-lower alkyl-substituted starting material or intermediate. In procedure I, an N-lower alkyl-substituted isatoic anhydride or anthranilic acid ester is used to prepare compounds of formula II in which $R_3$ is lower alkyl and an N-lower alkyl-substituted 2-lower alkylmercapto-2-imidazoline or -tetrahydropyrimidine is used to prepare compounds of formula I in which $R_2$ is lower alkyl. In procedure II, a N-lower alkyl substituted aniline is used as a starting material to prepare N-lower alkyl compounds of formula II and a 2-lower alkylamino quinazoline intermediate is used to prepare compounds of formula I in which $R_2$ is lower alkyl. In procedure III, a 2-lower alkylaminoquinazoline is used as a starting material to prepare compounds of formula I in which $R_2$ is lower alkyl and a 1-lower alkyl-2-iminoquinazoline starting material is used to prepare compounds of formula II in which $R_3$ is lower alkyl.

The compounds of formulas I and II in which $R_2$ and $R_3$ are lower alkyl and lower alkanoyl may be prepared by reacting the N-unsubstituted imidazo and pyrimido[2,1-b]-quinazolines with a lower alkyl halide to prepare the N-lower alkyl compounds and with a lower alkanoyl halide or a lower alkanoic anhydride to give the N-lower alkanoyl compounds. The 1-lower alkyl and 10(or 11)-lower alkyl compounds prepared by this procedure are separated by fractional recrystallization or chromatography. Similarly, the 1-lower alkanoyl and 10(or 11)-lower alkanoyl compounds are separated by fractional recrystallization or chromatography.

Alternatively, compounds of formulas I and II in which $R_1$ is halo, sulfamoyl or lower alkanoyl are prepared from the corresponding compounds in which $R_1$ is hydrogen. The halo substituted imidazo or pyrimidoquinazolines are prepared by reacting the compounds in which $R_1$ is hydrogen with a halogenating agent such as an N-halosuccinimide. Reacting compounds in which $R_1$ is hydrogen with chlorosulfonic acid and treating the resulting chlorosulfonyl substituted compound with ammonia gives the sulfamoyl imidazo and pyrimidoquinazolines. Compounds of formulas I and II in which $R_1$ is lower alkanoyl are prepared by reacting an imidazo or pyrimidoquinazoline in which $R_1$ is hydrogen with, for example, a lower alkanoyl chloride or lower alkanoic acid anhydride and aluminum chloride.

Compounds in which $R_1$ is hydroxy may be made by cleavage of the corresponding lower alkoxy derivatives by ether cleavage procedures.

The pharmaceutically acceptable acid addition salts of the compounds of formulas I and II are formed with organic and inorganic acids by methods known to the art. The base is reacted with an organic or inorganic acid in aqueous miscible solvent, such as acetone or ethanol, with isolation of the salt by concentration and cooling or in aqueous immiscible solvent, such as ethyl ether or chloroform, with the desired salt separating directly. Exemplary of such organic salts are those with maleic, fumaric, benzoic, ascorbic, pamoic, succinic, bis-methylenesalicylic, methanesulfonic, ethanedisulfonic, acetic, propionic, tartaric, salicylic, citric, gluconic, lactic, malic, mandelic, cinnamic, citraconic, aspartic, stearic, palmitic, itaconic, glycolic, p-aminobenzoic, glutamic, benzene sulfonic and theophylline acetic acids as well as with the 8-halotheophyllines, for example, 8-bromotheophylline. Exemplary of such inorganic salts are those with hydrochloric, hydrobromic, sulfuric, sulfamic, phosphoric and nitric acids. Of course, these salts may also be prepared by the classical method of double decomposition of appropriate salts which is well known to the art.

The compounds of this invention may be administered internally in conventional dosage forms by incorporating an appropriate dose of the compound with pharmaceutical carriers according to accepted pharmaceutical practices.

The following examples are not limiting but are illustrative of the compounds of this invention and of procedures for their preparation.

EXAMPLE 1

1,2,3,5-Tetrahydroimidazo[2,1b]quinazoline-5-one (9.5 g.) is suspended in 200 ml. of tetrahydrofuran and the suspension is added dropwise to a stirred suspension of 3.88 g. of lithium aluminum hydride in 300 ml. of tetrahydrofuran. The mixture is heated at reflux for about 3 hours, then cooled. The excess hydride is decomposed by adding 5 ml. of water, 5 ml. of 15 percent aqueous sodium hydroxide solution and then 15 ml. of water. The mixture is then stirred and filtered and the solid material obtained is extracted with hot tetrahydrofuran. The filtrate and the extract are combined and evaporated to dryness in vacuo. The residue is recrystallized from ethanol to give 1,2,3,5-tetrahydroimidazo[2,1-b]quinazoline.

A stirred suspension of 5 g. of the free base in 100 ml. of methanol is treated with ethereal hydrogen chloride. The mixture is stirred, ether is added and the mixture is filtered. The solid material is recrystallized from ethanol to give 1,2,3,5-tetrahydroimidazo[2,1e-b]quinazoline hydrochloride.

EXAMPLE 2

A mixture of 43.5 g. of 5chloroisatoic anhydride and 29 g. of 2-ethylmercapto-2-imidazoline is heated slowly to 150°–170° C. After the gas evolution ceases, the mixture is cooled and recrystallized from ethanol to give 7-chloro-1,2,3,5-tetrahydroimidazo[2,1-b]quinazolin-5-one.

A suspension of 7 g. of 7-chloro-1,2,3,5-tetrahydroimidazo[2,1-b]quinazoline-5-one in 500 ml. of tetrahydrofuran is added slowly to a stirred suspension of 2.48 g. of lithium aluminum hydride in 200 ml. of tetrahydrofuran. The mixture is heated at reflux, then treated with 2.5 ml. of water, 2.5 ml. of 15 percent aqueous sodium hydroxide solution and then 6.5 ml. of water. The mixture is stirred and filtered. The solid material is extracted with 1.5 l. of boiling methanol. The filtrate and extract are combined and evaporated in vacuo to give as the residue 7-chloro-1,2,3,5-tetrahydroimidazo[2,1-b]quinazoline.

The free base in methanol is stirred with ethereal hydrogen chloride. Adding ether, filtering and recrystallizing from ethanol gives 7-chloro-1,2,3,5-tetrahydroimidazo[2,1-b]-quinazoline hydrochloride.

EXAMPLE 3

A solution of 140 mg. of 1,2,3,5-tetrahydroimidazo-[2,1-b]quinazoline in 10 ml. of methanol is heated with 1 ml. of methyl iodide in a bomb at 100° C. for 72 hours. The mixture is then concentrated and filtered to give 1-methyl-1,2,3,5-tetrahydroimidazo[2,1-b]quinazoline hydroiodide and 10-methyl-2,3,5,10-tetrahydroimidazo[2,1-b]quinazoline hydroiodide. These hydroiodide salts are dissolved in water and the solution is basified, then extracted with ether. The ether is removed from the extract by evaporating in vacuo to give 1-methyl-1,2,3,5-tetrahydroimidazo[2,1-b]quinazoline and 10-methyl-2,3,5,10-tetrahydroimidazo[2,1-b]quinazoline. These compounds are separated by chromatography on basic alumina.

By the same procedure, using 1.5 ml. of ethyl bromide in place of methyl iodide, the products are 1ethyl-1,2,3,5-tetrahydroimidazo[2,1-b]quinazoline and 10-ethyl-2,3,5,10-tetrahydroimidazo[2,1-b]quinazoline. These compounds are separated by chromatography.

Using 2.5 ml. of butyl bromide in the above procedure in place of methyl iodide, the products are 1-butyl-1,2,3,5-tetrahydroimidazo[2,1-b]quinazoline. These compounds are separated by chromatography.

EXAMPLE 4

One gram of 1,2,3,5-tetrahydroimidazo[2,1-b]-quinazoline and 25 ml. of acetic anhydride are heated on a steam bath for 30 minutes. The solid material is filtered off. The filtrate is treated with water, then basified and filtered. The solid material obtained from these two filtrations is combined. This material is 1-acetyl-1,2,3,5-tetrahydroimidazo-[2,1-b]quinazoline and 10-acetyl-2,3,5,10-tetrahydroimidazo-[2,1-b]quinazoline. These compounds are separated by chromatography on alumina.

EXAMPLE 5

By the procedure of example 2, using in place of 5-chloroisatoic anhydride the following:
3-chloroisatoic anhydride
4-chloroisatoic anhydride
6-bromoisatoic anhydride
5-fluoroisatoic anhydride
6-trifluoromethylisatoic anhydride
6-methylisatoic anhydride 3-methylisatoic anhydride
6-ethylisatoic anhydride
6-propylisatoic anhydride
the following products are obtained, respectively:
9-chloro-1,2,3,5-tetrahydroimidazo[2,1-b]quinazoline
8-chloro-1,2,3,5-tetrahydroimidazo[2,1-b]quinazoline
6-bromo-1,2,3,5-tetrahydroimidazo[2,1-b]quinazoline
7-fluoro-1,2,3,5-tetrahydroimidazo[2,1-b]quinazoline
6-trifluoromethyl-1,2,3,5-tetrahydroimidazo[2,1-b]-quinazoline
6-methyl-1,2,3,5-tetrahydroimidazo[2,1-b]quinazoline
9-methyl-1,2,3,5-tetrahydroimidazo[2,1-b]quinazoline
6-ethyl-1,2,3,5-tetrahydroimidazo[2,1-b]quinazoline
6-propyl-1,2,3,5-tetrahydroimidazo[2,1-b]quinazoline.

EXAMPLE 6

By the procedure of example 4, using propionic anhydride in place of acetic anhydride, the produces are 1-propionyl-1,2,3,5-tetrahydroimidazo[2,1-b]quinazoline and 10-propionyl-2,3,5,10-tetrahydroimidazo[2,1-b]quinazoline. These compounds are separated by chromatography.

Also, by the procedure of example 4, using butyric anhydride in place of acetic anhydride, the products are 1-butyryl-1,2,3,5-tetrahydroimidazo[2,1-b]quinazoline and 10-butyryl-2,3,5,10-tetrahydroimidazo[2,1-b]quinazoline.

EXAMPLE 7

16.7 grams of 3-methoxyanthranilic acid in a mixture of 12 ml. of concentrated hydrochloric acid and 100 ml. of water is treated with a slow stream of phosgene maintaining the temperature at about 50° C. After two hours, the precipitated solid material is collected by filtration, washed with water and recrystallized from ethanol to give 3-methoxyisatoic anhydride.

3-Methoxyisatoic anhydride (9.1 g.) is mixed with 6.5 g. of 2-ethylmercapto-2-imidazoline and the mixture is heated to 150°–170° C. until the evolution of gas ceases. The solid is extracted with ethanol and the extracts are concentrated, cooled and filtered to give 9-methoxy-1,2,3,5-tetrahydroimidazo-[2,1-b]quinazolin-5-one.

Three grams of the above prepared quinazolinone is treated with 1.0 g. of lithium aluminum hydride in refluxing tetrahydrofuran by the procedure of example 1. After working up as in example 1, 9-methoxy-1,2,3,5-tetrahydroimidazo[2,1-b]-quinazoline is obtained.

The above-prepared base is treated with ethereal hydrogen chloride to give 9-methoxy-1,2,3,5-tetrahydroimidazo-[2,1-b]quinazoline hydrochloride.

EXAMPLE 8

Eight grams of 1,2,3,5-tetrahydroimidazo[2,1-b]-quinazoline is mixed with 40 ml. of chlorosulfonic acid previously chilled in an ice bath. The resulting mixture is stirred for 30 minutes and then poured into crushed ice. The solution is carefully neutralized with ammonium hydroxide and the precipitate is filtered off and recrystallized from chloroform to give 7-chlorosulfonyl-1,2,3,5-tetrahydroimidazo-[2,1-b]quinazoline.

A solution of 2 g. of the above prepared chlorosulfonyl compound in 100 ml. of chloroform is treated with excess ammonia gas and the mixture is heated in a steel bomb at 100° C. for 30 minutes, then cooled. The precipitate is filtered off and recrystallized from ethanol to give 7-sulfamoyl-1,2,3,5-tetrahydroimidazo[2,1-b]quinazoline.

EXAMPLE 9

To a stirred solution of 5 g. of 9-methoxy-1,2,3,5-tetrahydroimidazo[2,1-b]quinazoline, prepared as in example 7, in 100 ml. of methylene chloride at 0° C. is added dropwise 10 g. of boron tribromide. The resulting mixture is stirred at 25° C. for 3 hours, 50 ml. of methanol is added and the solution is concentrated and diluted with 10 percent aqueous sodium bicarbonate solution. The precipitated solid is recrystallized from isopropanol to give 9-hydroxy-1,2,3,5-tetrahydroimidazo-[2,1-b]quinazoline.

EXAMPLE 10

5-n-Butylanthranilic acid (19.3 g.) in a mixture of 12 ml. of concentrated hydrochloric acid and 100 ml. of water is treated with phosgene by the procedure described in example 7. After working up by the procedure of example 7, 5-n-butylisatoic anhydride is obtained.

5-n-Butylisatoic anhydride (10.9 g.) is heated with 6.5 g. of 2-ethylmercapto-2imidazoline by the procedure of example 2. After working up by the procedure of example 2 and recrystallizing from ethanol, 7-butyl-1,3,3,5-tetrahydroimidazo-[2,1-b]quinazoline-5-one is obtained.

The above-prepared quinazolin-5-one is reduced to 7-butyl-1,2,3,5-tetrahydroimidazo[2,1-b]quinazoline using lithium aluminum hydride by the procedure described in example 1.

HEXAMPLE 11

To a solution of 90 g. of chloral hydrate in 1,200 ml. of water, 1,300 g. of sodium sulfate and a solution of 82.5 g. of p-butoxyaniline in 300 ml. of water and 43 ml. of concentrated hydrochloric acid are added. Hydroxylamene hydrochloride (110 g.) in 500 ml. of water is added and the mixture is quickly heated to vigorous boiling. The boiling is continued for about 10 minutes. After cooling, N-(p-butoxyphenyl)-α-hydroxyiminoacetamide crystallizes and is filtered off.

The above prepared acetamide compound (100 g.) is added in portions with stirring to 300 ml. of concentrated sulfuric acid (prewarmed to 50°) at a rate so as to keep the temperature between 60°–70° C. The reaction mixture is then heated to 80° C. for 10 minutes, then cooled and poured into an ice bath. The precipitate is filtered off and washed with water to give 5-butoxyisatin.

To a stirring solution of 60 g. of 5-butoxyisatin in 600 ml. of glacial acetic acid cooled in an ice bath is added 150 g. of chromium trioxide in portions so as to keep the temperature between 10°–15° C. The stirring is continued for 12 hours at 15° C., 1.5 hours at 40° C. and one hour at 75° C. The mixture is cooled and then poured into an ice-water mixture. The precipitate is filtered off and washed well with water to give 5-butoxyisatoic anhydride.

5-Butoxyisatoic anhydride (23.5 g.) and 13 g. of 2-ethylmercapto-2-imidazoline are heated together by the procedure of example 2 to give 7-butoxy-1,2,3,5-tetrahydro-imidazo[2,1-b]quinazolin-5-one.

The above-prepared quinazolinone is treated with lithium aluminum hydride by the procedure of example 1 to give 7-butoxy-1,2,3,5-tetrahydroimidazo[2,1-b]quinazoline The corresponding hydrochloride salt is prepared by treating the free base with ethereal hydrogen chloride in methanol.

EXAMPLE 12

Ten grams of 1,2,3,4-tetrahydro-6H-pyrimido[2,1-b]-quinazoline-6-one is treated with lithium aluminum hydride in ether by the procedure of example 1 to give 1,2,3,4-tetrahydro-6H-pyrimido[2,1-b]quinazoline.

The corresponding hydrochloride salt is formed by treating the free base in methanol with ethereal hydrogen chloride.

EXAMPLE 13

Five grams of 1-methyl-1,2,3,5-tetrahydroimidazo-[2,1-b]quinazoline-5-one is treated with 2 g. lithium aluminum hydride in tetrahydrofuran by the procedure of example 1 to give 1-methyl-1,2,3,5-tetrahydroimidazo[2,1-b]quinazoline.

Treating the above prepared compound with ethereal hydrogen chloride gives 1-methyl-1,2,3,5-tetrahydroimidazo-[2,1-b]quinazoline hydrochloride.

EXAMPLE 14

2,4,6-Trichloroquinazoline (28 g.) and 19 g. of 1,3-propanediol are boiled in 350 ml. of acetone for 4 hours with 35 g. of potassium carbonate. Water is added and the precipitate is filtered off to give 2,6-dichloro-4-(3-hydroxypropoxy)quinazoline which is recrystallized from benzene.

Ten grams of 2,6-dichlor-4-(3-hydroxypropoxy)-quinazoline is boiled with 60 ml. of thionyl chloride for 1 hour and then poured onto ice. The precipitate is filtered off to give 2,6-dichloro-3-(3-chloropropyl)-3,4-dihydroquinazolin-4-one which is recrystallized from petroleum ether.

Three grams of the above-prepared quinazolinone is heated with 25 ml. of ethanolic ammonia in a steel bomb at 80° C. for 1 hour. The solvent is then removed and the residue is washed with water and recrystallized from ethanol to give 8-chloro-1,2,3,4-tetrahydro-6H-pyrimido[2,1-b]quinazoline-6-one.

Treating the above-prepared quinazolinone with lithium aluminum hydride in tetrahydrofuran by the procedure of example 1 gives 8-chloro-1,2,3,4-tetrahydro-6H-pyrimido[2,1-b]-quinazoline.

EXAMPLE 15

1,2,3,5-Tetrahydroimidazo[2,1-b]quinazoline, prepared as in example 1, in ethanol is treated with 1.1 equivalents of fumaric acid. The mixture is warmed on a steam bath for 5 minutes, then evaporated to dryness in vacuo. The residue is recrystallized from isopropanol to give 1,2,3,5-tetrahydroimidazo[2,1-b]quinazoline fumarate.

Similarly, using maleic acid in the above procedure, the maleate salt of 1,2,3,5-tetrahydroimidazo[2,1-b]quinazoline is prepared.

Treating 1,2,3,5-tetrahydroimidazo[2,1-b]quinazoline with a slight excess of glacial acetic acid, then adding ether and filtering gives the acetate salt of 1,2,3,5-tetrahydro-imidazo[2,1-b]quinazoline.

What is claimed is:

1. A compound selected from the group consisting of compounds of the following formulas:

Formula I 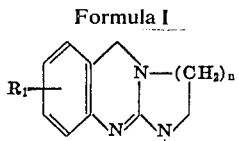   Formula II 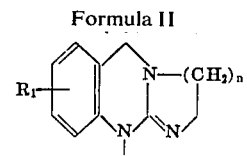

in which:

$R_1$ is hydrogen, halogen, trifluoromethyl, lower alkyl, lower alkoxy, lower alkanoyl, sulfamoyl or hydroxy;

$R_2$ is hydrogen, lower alkyl or lower alkanoyl;

$R_3$ is lower alkyl or lower alkanoyl and $n$ is 1 or 2 and pharmaceutically acceptable acid addition salts thereof.

2. A compound of claim 1 according to formula I in which $R_1$ and $R_2$ are hydrogen and $n$ is 1.

3. A compound of claim 1 according to formula I in which $R_1$ is chloro, $R_2$ is hydrogen and $n$ is 1.

4. A compound of claim 1 according to formula I in which $R_1$ is trifluoromethyl, $R_2$ is hydrogen and $n$ is 1.

5. A compound of claim 1 according to formula I in which $R_1$ is methyl, $R_2$ is hydrogen and $n$ is 1.

6. A compound of claim 1 according to formula I in which $R_1$ is hydrogen, $R_2$ is methyl and $n$ is 1.

7. A compound of claim 1 according to formula I in which $R_1$ and $R_2$ are hydrogen and $n$ is 2.

\* \* \* \* \*